United States Patent [19]

Haidlen et al.

[11] Patent Number: 4,569,368
[45] Date of Patent: Feb. 11, 1986

[54] APPARATUS FOR PROVIDING A LINK BETWEEN TWO SUCTION PROMOTING LINES

[75] Inventors: Götz Haidlen, Dietzenbach; Edmund Gröpl, Mühlheim, both of Fed. Rep. of Germany

[73] Assignee: Hartmann Foerdertechnik GmbH, Offenbach, Fed. Rep. of Germany

[21] Appl. No.: 648,982

[22] Filed: Sep. 10, 1984

[30] Foreign Application Priority Data

Sep. 21, 1983 [DE] Fed. Rep. of Germany ....... 3334076

[51] Int. Cl.$^4$ .......................... F16K 7/18; F16K 51/02
[52] U.S. Cl. ................... 137/625.28; 251/901
[58] Field of Search ............ 251/DIG. 2; 137/625.28

[56] References Cited

U.S. PATENT DOCUMENTS 2,548,333 4/1951 Anderson .................. 137/625.28 X

FOREIGN PATENT DOCUMENTS 462135 8/1926 Fed. Rep. of Germany ... 251/DIG. 2
2260059 6/1974 Fed. Rep. of Germany ... 251/DIG. 2

Primary Examiner—Arnold Rosenthal
Attorney, Agent, or Firm—Marmorek, Guttman & Rubenstein

[57] ABSTRACT

An apparatus for connecting two pneumatic suction-promoting lines which are arranged at an angle to one another is disclosed. A first suction promoting line (8) has a flat or almost flat upper surface, which surface is provided with a multiplicity of openings (9) along its length. A flexible sealing band (7) extends along the length of the first suction promoting line and serves to seal off the openings (9). The connecting apparatus includes a carriage (1) which is movable along the first suction promoting line (8). The carriage (1) is adapted to lift a desired portion of the sealing band off the upper surface of the first suction promoting line (8) so as to expose some of the openings (9) of the first suction promoting line. The second suction promoting line (14) is mounted on the carriage (1) and is located in the free space between the upper surface of the first suction promoting line and the raised portion of the sealing band (7). Also mounted on the carriage in the free space is a connecting line (15) which serves to connect the second suction promoting line (14) with the exposed openings (9) of the first suction promoting line (8).

3 Claims, 2 Drawing Figures

APPARATUS FOR PROVIDING A LINK BETWEEN TWO SUCTION PROMOTING LINES

FIELD OF THE INVENTION

This invention relates to an arrangement for establishing a link between two pneumatic suction-promoting lines, which lines are oriented at any desired angle with respect to one another.

BACKGROUND OF THE INVENTION

DE-OS 28 24 484 and DE PS 28 24 484 disclose a suctioning machine in which a branch suction promoting line is connected to a main suction promoting line, the branch line being oriented at an angle to the main line. The connection is achieved by means of rigid tubular conduits twistable toward each other.

One disadvantage of the type of connection mechanism disclosed in the afore-mentioned reference is that a relatively large distance must be maintained between successive branch connections made to the main suction promoting line.

A further disadvantage of the afore-mentioned connection between suction promoting lines is that the rigid tubular conduits used to achieve the connection must be formed with a very high degree of precision to prevent suctioning losses when the connection is made. Exact alignment between the branch suction promoting line and the main suction promoting line is difficult since the branch line is not longitudinally movable relative to a main line, especially after insertion of the tubular connecting members. A smooth linkage is often achievable only after additional corrective steps are taken, which steps may include installation of a portal. As a result of this, the coupling of the branch and main lines cannot be automated even after a relatively good alignment between the branch and main lines is achieved. Furthermore, the above described connection mechanism requires use of a plurality of valves for use in relation with the opening and closing of the connections. Finally, such a connection mechanism is expensive to manufacture and also requires the incurring of high maintenance and repair costs.

It is the object of the present invention to provide an apparatus for establishing connections between suction promoting lines which eliminates or reduces the shortcomings of the above described connection mechanism. More particularly, it is an object of the present invention to provide an apparatus which enables branch connections to be made to a suction promoting line at frequent intervals along its length and which facilitates alignment of the branch and main suction promoting lines to be connected. It is a further object of the present invention to provide an apparatus for establishing connections between suction promoting lines, which reduces or eliminates the need for complex valve systems, and which results in a reduction of maintenance and repair costs.

SUMMARY OF THE INVENTION

The present invention is an apparatus for connecting first and second suction-promoting lines, which lines are oriented at an angle with respect to one another.

The first or main suction promoting line is preferably formed as a straight tube which has a planar or almost planar upper surface. The planar or almost planar upper surface is provided with a multiplicity of openings. A flexible sealing band runs longitudinally along the first suction promoting line and serves to seal off the openings in the upper surface thereof.

In a preferred embodiment, the connecting apparatus of the present invention includes a carriage which is movable along the length of the first suction promoting line. The carriage serves to lift a portion of the sealing band off the upper surface of the first suction promoting line so as to expose some of the openings in the upper surface of the first suction promoting line.

The second or branch suction promoting line, which is typically oriented at a right angle to the first or main suction promoting line, is mounted to the carriage in the free space between the upper surface of the first suction promoting line and the raised portion of the sealing band.

Within the free space defined by the raised sealing band is arranged a connection line which serves to connect the second suction promoting line with the uncovered openings of the first suction promoting line. Since the carriage is movable along the length of the first suction promoting line, the connection between the first and second suction promoting lines may be achieved at any desired location along the lnegth of the first suction promoting line. Longitudinal movement of the carriage also facilitates alignment between the first and second suction promoting lines.

When several of the inventive devices are used, a plurality of connections may be made to the first suction promoting line, the connections being spaced apart by relatively short distances. In addition, use of the inventive connecting apparatus allows connections to be achieved between suction promoting lines without the use of complex valve systems. Thus, use of the inventive apparatus results in a reduction in maintenance and repair costs.

DETAILED DESCRIPTION OF THE INVENTION

Figure 1:
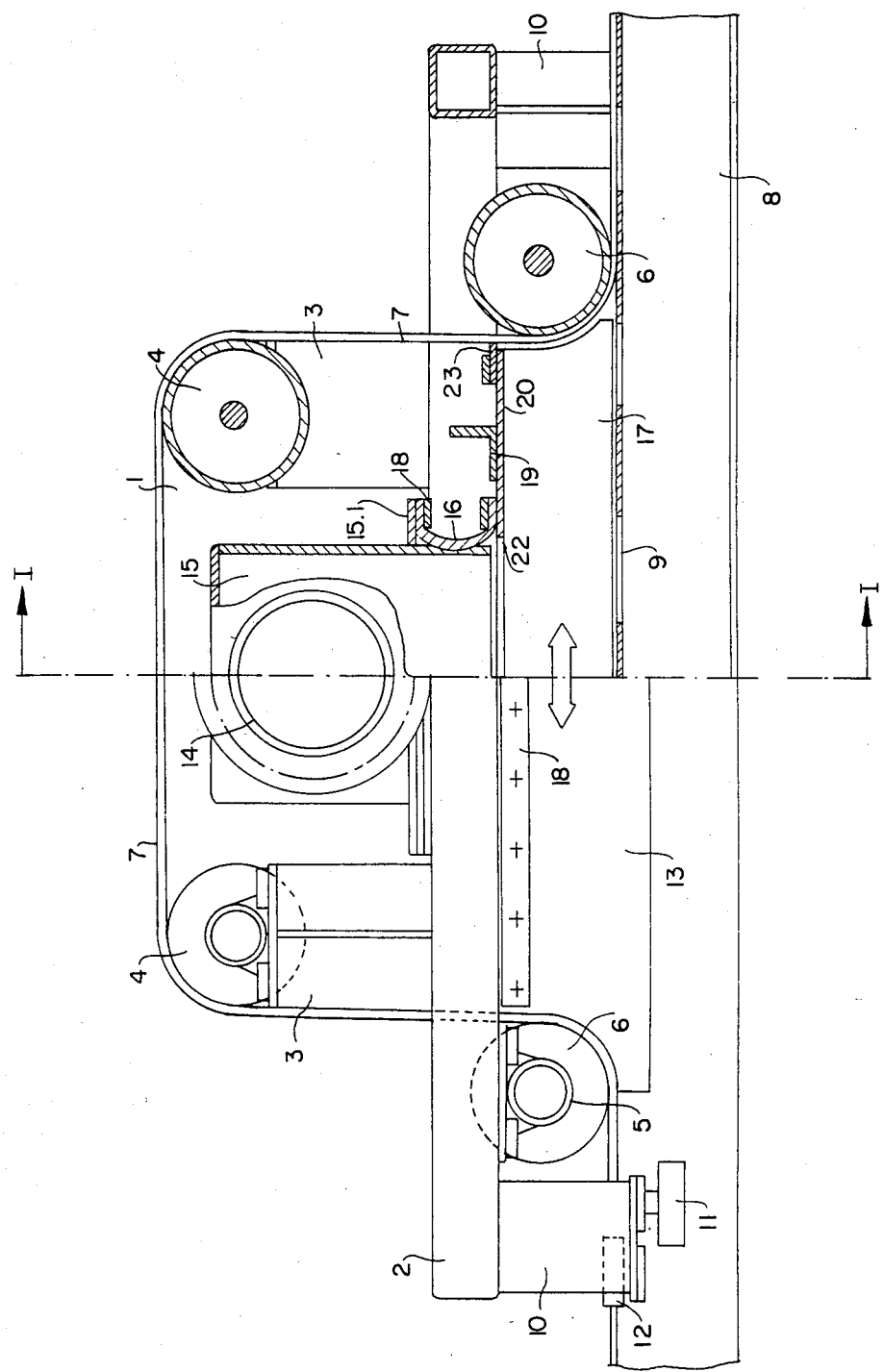
FIG. 1 schematically illustrates an apparatus for providing a link between two suction promoting lines in accordance with an illustrative embodiment of the invention. The left side of FIG. 1 is a side view of the apparatus while the right side of FIG. 1 is a cutaway view of the interior of the apparatus.
Figure 2:
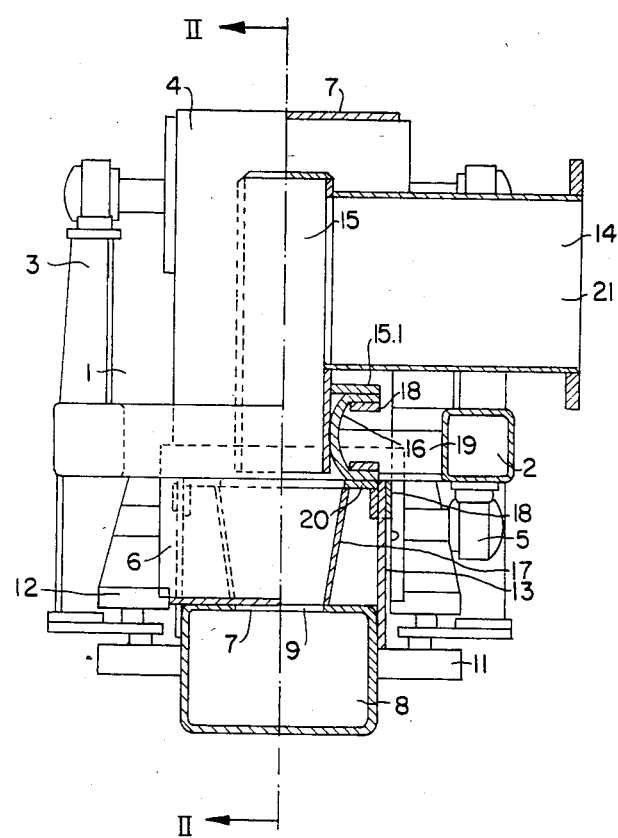
FIG. 2 shows a cross-sectional view of the apparatus of FIG. 1 taken along the line I—I of FIG. 1.

Referring to FIGS. 1 and 2, there is illustrated an apparatus for providing a connection between the suction promoting lines 8 and 14, which lines 8 and 14 are oriented at right angles to one another.

Preferably, the suction promoting line 8 has a generally planar or slightly curved upper surface. A multiplicity of openings 9 are formed in the upper surface of the suction promoting line 8 at various locations along its length. Typically, the suction promoting line 8 is formed as a generally straight tube of rectangular cross-section, although in particular instances alternative geometries for the suction promoting line 8 may be utilized. The openings 9 in the upper surface of the suction promoting line 8 are preferably cylindrical, but they may also be formed as slits of any desired length. The minimum distance between the openings is determined only by the allowable static weakening of the walls of the suction promoting line 8.

A sealing band 7 extends longitudinally along the upper surface of the suction promoting line 8. The sealing band 7 serves to seal the openings 9 in the upper surface of the suction promoting line 8.

A connection carriage 1 which includes a generally rectangular frame 2 serves to raise a portion of the sealing band 7 off the upper surface of the suction promoting line 8. The rectangular frame 2 comprises two relatively long sides which extend parallel to the suction promoting line 8 and two generally short sides which extend across the suction promoting line 8. The sealing band 7 is lifted off the suction promoting line 8 by way of the lower rollers 6 which are supported by bearings 5 and by way of the upper rollers 4 which are mounted on roller supports 3. Typically the upper rollers 4 are identical in size to the lower rollers 6. The positions of the upper rollers 4 and lower rollers 6 are chosen so that the sealing band 7 steps vertically upward from the upper surface of the suction promoting line 8. Between the upper rollers 4, the sealing band 7 extends parallel to the upper surface of the suction promoting line 8. As a result of raising a selected portion of the sealing band 7 off the upper surface of the suction promoting line 8, a selected one of the openings 9 is exposed. As will be seen below, the connection between the suction promoting line 8 and the suction promoting line 14 will be made by way of the exposed opening(s).

The carriage 1 is movable along the length of the suction promoting line 8 so that the connection with the suction promoting line 14 may be achieved by way of any of the openings 9 located on the upper surface of the suction promoting line 8. Guidance of the carriage 1 over the rectangular suction promoting line 8 is accomplished by means of four roller supports 10, one roller support 10 being associated with each corner of the generally rectangular frame 2. Each roller support 10 is provided with a relatively large guiding roller 11 for coupling the carriage 1 to the suction promoting line 8 and a relatively small guiding roller for coupling the carraige 1 to the sealing band 7. The use of separate guiding rollers to couple the sealing band 7 and the suction promoting line 8 to the carriage 1 particularly enables those openings 9 which are not under the portion of the sealing band lifted by the carriage to remain securely sealed.

Mounted on the carriage 1 in the free space between the raised portion of the sealing band 7 and the upper surface of the suction promoting line 8 is suction promoting line 14. Coupled to the suction promoting line 14 is the rectangular connecting tube 15, which tube serves to connect the suction promoting line 14 to one of the openings 9 of the suction promoting line 8. The measns by which this connection may be achieved is discussed below.

Extending across the carriage frame 2 between the two longer sides thereof are a pair of angle support brackets 19. One leg of each of the angle support brackets 19 generally lies in the same plane as the bottommost surface of the rectangular carriage frame 2.

Mounted underneath the angle support brackets 19 is a rectangular plate 20. The rectangular plate 20 has a width approximately equal to the width of the suction promoting line 8. The lnegth of the rectangular plate 20 is approximately equal to the distance between the axes of rotation of the rollers 6 reduced by twice the radius of the rollers 6 and reduced by twice the thickness of the sealing band 7; namely, the length of the plate 20 is roughly equal to the distance between the two points at which the sealing band 7 steps perpendicularly upward from the upper surface of the suction promoting line 8.

Longitudinally mounted to the rectangular plate 20 are two flexible side strips 12. The length of the side strips 13 is approximately equal to the distance between the axes of rotation of the lower rollers 6. The side strips 13 are mounted to the outer side walls of the suction promoting line 8. More particularly, the side strips 13 extend one-fourth to one-half the way down the outer walls of the suction promoting line 8.

In short, the rectangular plate 20, the side strips 13, and the upper surface of the suction promoting line 8 serve to form a box which extends longitudinally above the suction promoting line 8 between the two vertically extending portions of the sealing band 7. The vertically extending portions of the sealing band 7 serve to seal the end faces of this box. This sealing is aided by band-sealing tongues 23 which run along the relatively short edges of the rectangular plate 20 and are affixed thereto.

The rectangular plate 20 is provided with a rectangular opening 22. The opening 22 has a cross-sectional area which is larger than the cross-sectional area of the rectangular connecting tube 15. The connecting tube 15 is coupled to one end of the second suction promoting line 14 and terminates at the opening 22 in the rectangular plate 20. Thus, the suction promoting line 14 is coupled to selected one or ones of the openings 9 in the suction promoting line 8 by way of the connecting tube 15 and the box defined by the plate 22, and the side strips 13.

Longitudinally extending strips 17 form a protective casing, which casing extends from the borders of the opening 22 to the upper surface of the suction promoting line 8. The inner strips 17 are oriented at an angle relative to the outer strips 13. In certain cases, it is preferable that the outer strips 13 and the band sealing tongues 23 have some elasticity. However, this elasticity should be limited so that the strips 13 and the sealing tongues 23 are not drawn inward toward the protective casing defined by the strips 17.

The connecting suction tube 15 is sealed to the plate 22 by way of flange 15.1 which surrounds the tube 15 and by way of sealing element 16. The sealing element 16 is held in place by tension producing elements 18.

Finally, the above described embodiments of the invention are intended to be illustrative only. Numerous alternative embodiments may be devised by those skilled in the art without departing from the spirit and scope of the following claims:

What is claimed is:

1. An apparatus for establishing a link between first and second suction promoting lines arranged at any desired angle relative to one another, the first of said suction promoting lines having an approximately planar upper surface, which upper surface is provided with a multiplicity of openings along the length of the first suction promoting line, said first suction promoting line having a rectangular cross-section and being stationary;

said apparatus comprising, (a) a sealing band extending longitudinally along the upper surface of said first suction promoting line for sealing off the openings formed in the upper surface of said first suction promoting line, said sealing band being displaceable upward away from said upper surface of said first suction promoting line to a predetermined height;

(b) a connection carriage movable longitudinally along said first suction promoting line by way of a plurality of roller supports mounted on said frame, each of said roller supports being connected to a first guiding roller for coupling said carriage frame to said first suction promoting line and a second guiding roller for coupling said carriage frame to said sealing band, said carriage including upper and lower rollers adapted to raise a desired portion of said sealing band from said upper surface of said first suction promoting line to expose at least a particular one of said openings formed in the upper surface of said first suction promoting line, said raised portion of said sealing band serving to define a free space between the raised portion of the sealing band and the upper surface of said first suction promoting line, said second suction promoting line being mounted on said carriage in said free space and being movable with said carriage, said connection carriage comprising a generally rectangular frame positioned above said first suction promoting line, said frame having two relatively long sides extending longitudinally along said first suction promoting line and two relatively short sides extending across said first suction promoting line, said rectangular frame serving to support a generally rectangular plate positioned over the upper surface of said first suction promoting line and extending longitudinally along said first suction promoting line between said lower rollers and having a width approximately equal to the width of said first suction promoting line, said rectangular plate being coupled to said first suction promoting line by longitudinally extending side strips, whereby said rectangular plate, said side strips and said upper surface of said first suction promoting line form a box whose end faces are sealed by vertically extending portions of said sealing band, said connection carriage further comprising a first set of sealing elements to seal said tube to said second suction promoting line and to said aperture in said rectangular plate and to form an inner sealing lock, a second set of sealing elements to seal said rectangular plate to said sealing band and to form an outer sealing lock, and a second set of side strips disposed about said box and connected to said first suction promoting line and said rectangular plate to form an outer protective box; and (c) connection means mounted on said carriage in said free space for connecting said second suction promoting line to said exposed opening in said upper surface of said first suction promoting line, said connection means including a tube extending from said second suction promoting line to an aperture in said rectangular plate, whereby a link between said first and second suction promoting lines is achieved.

2. The apparatus of claim 1 wherein said upper and lower rollers cooperate to raise said sealing band in a direction perpendicular to the plane of the upper surface of the first suction promoting line.

3. The apparatus of claim 1 wherein the length of said first set of side strips corresponds approximately to the distance between the axes of said lower rollers and said first set of side strips cover about one-fourth to one-half of the sides of said first suction promoting line.

* * * * *